INVENTOR.
AUDLEY B. LEAMAN
BY
George C. Sullivan
Agent

March 13, 1962 A. B. LEAMAN 3,024,592
PIN ACTUATING DEVICE
Filed Nov. 9, 1960 2 Sheets-Sheet 2

INVENTOR.
AUDLEY B. LEAMAN
BY
Agent

United States Patent Office 3,024,592
Patented Mar. 13, 1962

3,024,592
PIN ACTUATING DEVICE
Audley B. Leaman, Santa Cruz, Calif., assignor to Lockheed Aircraft Corporation, Burbank, Calif.
Filed Nov. 9, 1960, Ser. No. 68,188
2 Claims. (Cl. 60—26.1)

The present invention relates to an actuating device and more particularly to a pin actuating device that is light weight, compact, reliable and has a large power to weight ratio, and featuring a design which renders the device adaptable for varying stroke and power and, except for one additional step, permits the entire device to be made by an automatic lathe.

The present invention is used in conjunction with satellite systems and therefore light weight, minimum space consumption, high power and simplicity are critical factors. As a general rule, prior are devices relating broadly to the type hereinafter described, have not had to meet the stringent requirements of the present invention. As a consequence, these prior art devices have had a tendency to be bulky, somewhat heavy and require a considerable number of parts. In addition, these prior art devices have not been readily adaptable to different strokes and power levels and have generally required that milling operations be performed in addition to lathe operations in order to obtain close tolerances.

The present invention has obviated many of the disadvantages of these prior art devices in that weight, bulk, number of parts and machining operations have been reduced to a minimum. In addition, no milling operations are required since the necessary tolerances are readily obtainable on a lathe. It should be particularly noted that the present invention utilizes only five primary parts and three O-rings to perform the same function which many prior art devices have required the use of at least twice that number. These primary parts include a pin, casing, piston, insert ring and explosive squib. Preferably the pin is made of steel and the remaining parts being made of magnesium or other suitable light-weight materials. As it will hereinafter become apparent, the pin and cylinder may be integrally formed from the same piece of material. However, since it is necessary to make the pin of some very hard material such as hardened steel and it is necessary to obtain minimum weight, it is preferable to make the pin of steel and the cylinder of magnesium and thereby obtain minimum weight of the combination. It should also be noted that the above mentioned insert ring performs two functions, that is, it functions as a piston guide as well as a piston stop. Another important feature of the present invention is the length of passages through which the high pressure gases must flow are reduced to a minimum, thereby maintaining the pressure drop to the minimum possible level and obtaining maximum power output per unit weight. The two nozzles which are in communication with the expansible chamber are oppositely disposed so their reactive forces will counteract each other, resulting in a zero net reactive force. This feature is highly important in satellite systems wherein small unbalanced forces become critical and may cause precession of the satellite system.

An object of the present invention is to provide a light-weight, compact pin actuating device.

Another object is to provide a device wherein it is possible to make virtually the entire device by use of only an automatic lathe and thereby obviate the necessity of employing a milling machine.

Still another object is to provide a pin actuating device wherein the stroke and power levels thereof are readily adaptable to different values.

A still further object is to provide a pin actuating device having a minimum number of parts, thereby increasing the simplicity and reliability and decreasing the over-all weight factor.

A still further object of the present invention is to provide a pin actuating device wherein the net reactive forces are reduced to a minimum.

A still further object is to provide a pin actuating device having a large power to weight ratio.

The specific nature of the invention, as well as other objects, uses and advantages thereof, will clearly appear from the following description and from the accompanying drawing in which.

Like numerals designate like elements throughout the figures of the drawing.

Figure 1:
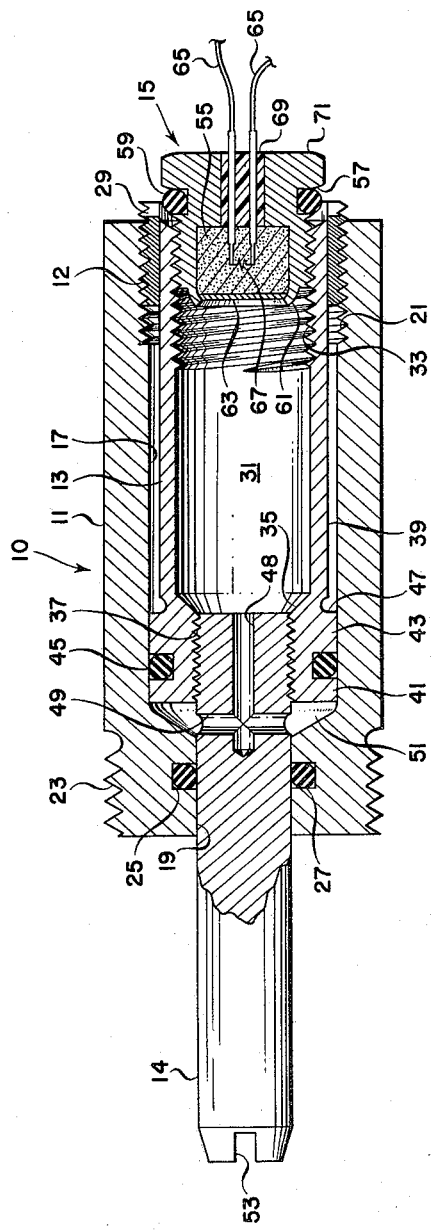
FIGURE 1 is an enlarged, detailed cross-sectional view of the pin actuating device.

Referring now to FIGURE 1 of the drawing is illustrated a pin actuating device 10 having five primary elements and three O-rings. These primary elements consist of casing 11, insert ring 12, piston 13, pin 14 and squib 15.

Casing 11 is cylindrical and has a large cylindrical cavity 17 in the rearward end which forwardly tapers into a smaller cylindrical opening 19. Disposed adjacent the rear end of the large cylindrical cavity are interior threads 21 and disposed at the forward end of casing 11 are exterior threads 23 for mounting the device as will hereinafter be described with reference to FIGURE 2. An annular groove 25 is provided adjacent opening 19 for receiving O-ring 27.

Annular insert ring 12 is provided, having exterior threads for cooperating with interior threads 21 and having slots 29 for receiving a spanner wrench or similar device for tightening into position. As will become evident, insert ring 12 functions both as a supporting surface and a stop for piston 13.

Piston 13 has a large cylindrical interior cavity 31, having interior threads 33 extending from the rear end thereof to approximately midpoint of the cylindrical cavity. Cylindrical cavity 31 has a forwardly tapering section 35, the small end of which is adjacent to interior threads 37. Exterior surface 39 of piston 13 is cylindrical and has an outside diameter somewhat less than the inside diameter of insert ring 12. At the forward end of piston 13 are provided outwardly extending circular ribs 41 and 43, which are spaced apart and thereby form an annular slot for receiving O-ring 45. Circular rib 43 is made of greater thickness than rib 41, since rib 43 will be subjected to considerable load when it collides with insert ring 12 upon actuation of the assembly. An annular fillet 47 is provided adacent rib 43 to prevent stress concentrations from being formed when rib 43 is heavily loaded at the end of the stroke. It should be particularly noted that the clearance between the outer periphery of ribs 41 and 43 and the interior surface of casing 11 may be relatively large, thereby obviating the necessity of milling these surfaces. This is also applicable to the interior surface of insert ring 12 and surface 39 of piston 13.

Pin 14 is subjected to lateral load by members in slidable contact with the surface thereof. Therefore, to prevent deformation and to provide a minimum coefficient of friction, it is necessary to make pin 12 of hardened high strength material such as steel. It is to be understood that piston 13 could be formed of the same material as is pin 14 and could therefore be made integral with each other, which would reduce the number of elements of the device. However, in order to obtain minimum overall weight, the piston and pin are formed of separate materials wherein the piston and pin are respectively made of magnesium and steel, for example. Pin 14 merely consists of a cylindrical rod 14 having threads at one end which are received by threads 37 of piston 13. Opening 48 is bored from the rear end of pin 14, concentric with the longitudinal axis thereof and extends forwardly a distance slightly greater than the length of threads 37 of piston 13. Opening 49 is bored normal to and through the axis of pin 14 and communicates with opening 48 to provide communication between interior cavity 31 of piston 13 and expansible chamber 51 formed between casing 11, piston 13 and pin 14. It should be particularly noted that opening 49 discharges into expansible chamber 51 in opposite directions and since the opening is of constant diameter, the gases will flow at equal rates in opposite directions thereby providing a zero net reactive thrust. Slot 53 may be provided at the forward end of pin 14 so that a tool may be employed to apply a torque and securely connect pin 14 to piston 13. In addition, the clearance between the exterior surface of the pin and surface 19 may be relatively large since O-ring 27 provides adequate seal.

Squib 15 is generally cylindrical and has a cavity at one end which is filled with a material 55 having a rapid burning rate, such as a double-based propellant. The squib has exterior threads for mating with threads 33 of piston 13 and annular groove 57 for receiving O ring 59 which prevents gas leakage from cavity 31 of piston 13. Forwardly extending cylindrical lip 61 is inwardly crimped to hold retaining disk 63 in a rigid position to maintain material 55 in place. Lead wires 65 have a resistive element 67 connected in series therewith so that upon the application of current thereto, the resistive element is heated, thus causing ignition of material 55. Gas is prevented from escaping past the lead wires through the opening at the rear end of squib 15 by filling the space with a sealing material which will retain its sealing characteristics at high temperatures. Outwardly extending section 71 of squib 15 may be hexagonally shaped to provide a surface to which a wrench or other tightening means may be applied. The longest diameter of section 71 is less than the interior diameter of insert ring 12 so that the insert ring may be the last element to be assembled and to provide a compact arrangement.

Figure 2:
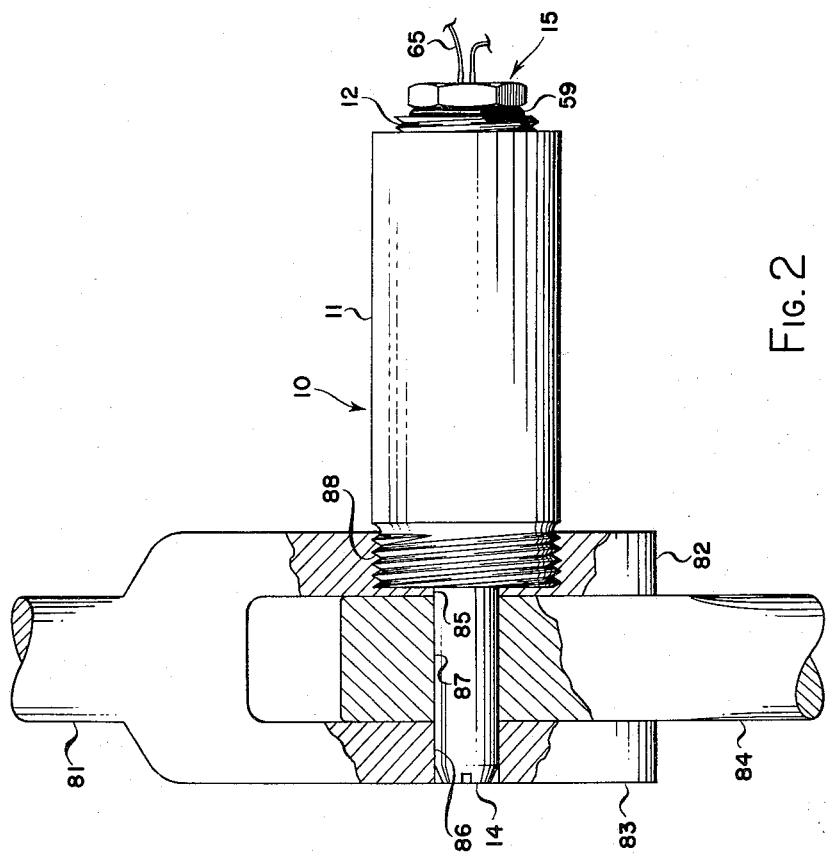
FIGURE 2 is a view of the pin actuating device of FIGURE 1 in combination with members, partly in section, which are released thereby.

The operation of the device is as follows: Prior to actuation of the device the piston and pin are forwardly positioned as shown in FIGURES 1 and 2 of the drawing. Upon the application of current through lead wires 65, material 55 is ignited, resulting in the rupture of retaining disk 63 and permitting the rapid expansion of gases into cavity 31. Cavity 31 is of sufficient volume so the gases escaping from the squib have a pressure drop to a value that does not cause deformation of the cavity wall. The gas from cavity 31 then flows through channels 48 and 49 and into expansible chamber 51. Gas pressure thus created in expansible chamber 51 acts against the surface of piston 13 and is of sufficient value to cause the initial movement of pin 14 rearwardly or to the right. It should be noted that pin 14 releases members which are in forced facial contact with the exterior surface of the pin and therefore the initial force necessary to cause relative motion therebetween is the greatest since static friction is greater than sliding friction. Once there is relative motion between the members to be released and pin 14, the force required to continue this motion is of lesser magnitude. Since the ignition of squib 15 is practically instantaneous, chamber 31 acts as a reservoir of high pressure gases and as the volume of expansible chamber 51 increases the force acting against the surface of piston 13 decreases, which is desirable since the resistive force on pin 14 is lesser and the shock on annular rib 43 when it contacts the base of insert ring 14 will be reduced to a minimum. It should be noted that the gas in cavity 31, openings 48 and 49 and expansible chamber 51 is prevented from leaking to ambient by O rings 25, 45 and 59. This being the case, pressure will remain on the base of piston 13 after it is completely displaced towards the rear, thereby eliminating the possibility that the piston and pin may move forward and interfere with the released members. Gas in these cavities will eventually leak to ambient; however, the period of time for this to take place is relatively long and the function of the released members will have been completed.

In order to render the disclosed pin actuating device readily adaptable for applying varying forces, threads 33 are extended into cavity 31. Therefore, the cavity is capable of receiving squibs of varying lengths with corresponding energy outputs. In order to render the device adaptable to varying stroke lengths, the length of threads 21 may be changed and insert ring 12 inserted to the end of the selected length.

In FIGURE 2 is shown the above described pin actuating device as coacting with members which are released thereby. These members may include U-shaped member 81 having extensions 82 and 83 and rod 84. Extension 82 and 83 and rod 84 are provided with longitudinally aligned openings 85, 86 and 87, respectively, for receiving pin 14 of actuating device 10. Extension 82 is also provided with internal threads 88, which are longitudinally aligned with opening 85, for cooperating with and receiving external threads 23 of actuating device 10. As assembled, actuating device 10 is mounted on extension 82 of member 81 with pin 14 extending through openings 85, 86 and 87 thereby interconnecting member 81 and rod 84. During normal operation member 81 and rod 84 respectively have oppositely directed forces applied thereto. Upon actuation of device 10, pin 14 is retracted thereby permitting separation of member 81 and rod 84.

In practice, the invention herein described has an overall length of approximately two and one-half inches, an external diameter of approximately three-quarters of an inch, a stroke of approximately three-quarters of an inch and a weight of less than one ounce. Nevertheless, the device is able to apply a force of approximately 300 pounds or permit release of members applying a 1,500 pound force against the pin surface and having a static coefficient of approximately .2.

It is to be understood in connection with this invention that the embodiments shown are only exemplary, and that various modifications can be made in construction and arrangement within the scope of the invention as defined in the appended claims.

What is claimed is:

1. A pin actuating device comprising a casing having a cylindrical chamber therein and internal threads in the wall of said chamber extending from one end to approximately one half the length of said chamber, a first opening at the other end of said casing communicating with said chamber, a cylindrical piston having a cavity therein and internal threads in the wall of said cavity extending from one end to approximately one half the length of said cavity, said piston including an annular rib extending outwardly from the exterior surface thereof, said piston being slidably mounted in said chamber, a pin operatively connected to the other end of said piston and extending through said first opening, an expansible chamber formed between said casing, pin, piston and rib, a second opening in said pin interconnecting said cavity and expansible chamber, gas producing means communicating with said cavity and having exterior threads operatively mounted in the threads of said cavity, an insert ring having external threads operatively mounted in the threads of said chamber whereby said insert ring limits the stroke of said piston by said rib contacting therewith and guides the movement of said piston by slidable contact with the surface thereof and the stroke of said piston may be varied by varying the position of said insert ring in the threads of said chamber and the power output of said device may be varied by varying the length of gas producing means mounted in the threads of said cavity.

2. The device of claim 1 wherein said second opening extends parallel to the longitudinal axis of said pin and in opposite directions and traverse to the longitudinal axis of said pin.

References Cited in the file of this patent

UNITED STATES PATENTS

| | | |
|---|---|---|
| 1,843,463 | Tawresey | Feb. 2, 1932 |
| 2,585,870 | Spielman | Feb. 12, 1952 |

FOREIGN PATENTS

| | | |
|---|---|---|
| 549,300 | Great Britain | Nov. 16, 1942 |